United States Patent
Ishikawa

(10) Patent No.: US 10,650,997 B2
(45) Date of Patent: May 12, 2020

(54) FUSE UNIT FOR CONNECTING BATTERY

(71) Applicant: YAZAKI CORPORATION, Tokyo (JP)

(72) Inventor: Yoshinori Ishikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 493 days.

(21) Appl. No.: 15/078,615

(22) Filed: Mar. 23, 2016

(65) Prior Publication Data

US 2016/0203934 A1  Jul. 14, 2016

Related U.S. Application Data

(63) Continuation of application No. PCT/JP2014/077253, filed on Oct. 10, 2014.

(30) Foreign Application Priority Data

Oct. 11, 2013 (JP) .................................. 2013-213908

(51) Int. Cl.
*H01H 85/02* (2006.01)
*H01H 85/08* (2006.01)
(Continued)

(52) U.S. Cl.
CPC ....... *H01H 85/0241* (2013.01); *B60R 16/023* (2013.01); *B60R 16/04* (2013.01);
(Continued)

(58) Field of Classification Search
CPC .. H01H 9/0264; H01H 85/0241; H01H 85/08; H01H 85/15; H01H 85/165;
(Continued)

(56) References Cited

U.S. PATENT DOCUMENTS 6,512,443 B1 * 1/2003 Matsumura .......... H01H 85/044
337/161
7,192,319 B1 * 3/2007 Rahman ............... H01H 85/044
439/766
(Continued)

FOREIGN PATENT DOCUMENTS

| JP | 2007-87823 A | 4/2007 |
|---|---|---|
| JP | 2010-205681 A | 9/2010 |
| JP | 2012-29512 A | 2/2012 |

OTHER PUBLICATIONS

International Search Report and Written Opinion of the International Search Report for PCT/JP2014/077253 dated Jan. 13, 2015.
International Preliminary Report on Patentability and English language Written Opinion of the International Search Report for PCT/JP2014/077253.

*Primary Examiner* — Jacob R Crum
(74) *Attorney, Agent, or Firm* — Kenealy Vaidya LLP

(57) ABSTRACT

A fuse unit for connecting a battery, including a fuse element having an external connection plate part to which a screw terminal fitting is screwed, a resin-made fuse housing for supporting the fuse element, and a rotation regulating part for stopping rotation of the screw terminal fitting screwed to the external connection plate part, the rotation regulating part includes a terminal abutting part which is formed by folding one edge of the external connection plate part and stops the rotation by abutting on one side edge of the screw terminal fitting, and a cover part which is formed integrally to the fuse housing and covers a back surface of the terminal abutting part.

6 Claims, 5 Drawing Sheets

(51) Int. Cl.
*H01H 85/165* (2006.01)
*B60R 16/023* (2006.01)
*B60R 16/04* (2006.01)
*H01H 85/20* (2006.01)
*H01H 9/02* (2006.01)

(52) U.S. Cl.
CPC .......... *H01H 85/08* (2013.01); *H01H 85/165* (2013.01); *H01H 85/2035* (2013.01); *H01H 9/0264* (2013.01); *H01H 2085/025* (2013.01)

(58) Field of Classification Search
CPC ............. H01H 85/175; H01H 85/2005; H01H 85/2035; H01H 2085/025; H01H 2085/2055; B60R 16/04; B60R 16/023
USPC ......................................................... 337/187
See application file for complete search history.

(56) References Cited

U.S. PATENT DOCUMENTS

| | | | |
|---|---|---|---|
| 8,794,990 B2 | 8/2014 | Deno et al. | |
| 2002/0163416 A1* | 11/2002 | Matsumura | H01H 85/044 337/112 |
| 2004/0018417 A1* | 1/2004 | Stack | H01H 85/044 429/61 |
| 2008/0239694 A1* | 10/2008 | Plummer | H01H 11/0031 361/837 |
| 2012/0293295 A1* | 11/2012 | Kibushi | H01H 85/044 337/142 |
| 2013/0122731 A1 | 5/2013 | Deno et al. | |

\* cited by examiner

FUSE UNIT FOR CONNECTING BATTERY

CROSS REFERENCE TO RELATED APPLICATION

This application is a continuation of PCT application No. PCT/JP2014/077253, which was filed on Oct. 10, 2014 based on Japanese Patent Application (No. 2013-213908) filed on Oct. 11, 2013, the contents of which are incorporated herein by reference. Also, all the references cited herein are incorporated as a whole.

BACKGROUND OF THE INVENTION

1. Technical Field

The present invention relates to a fuse unit for connecting a battery, and particularly to the fuse unit mounted on a battery box by making connection to a battery terminal fitted and connected to a battery post of the battery box mounted in a vehicle.

2. Description of the Related Art

The following PTL 1 discloses a fuse unit of a mode of being mounted on a battery box by making connection to a battery terminal fitted and connected to a battery post of the battery box mounted in a vehicle.

FIGS. 4 and 5 illustrate a fuse unit having a configuration equal to that of the fuse unit for connecting the battery disclosed in PTL 1 described above.

This fuse unit 100 for connecting the battery includes a fuse element 110 integrally formed of a metal plate, a resin-made fuse housing 120 for supporting the fuse element 110, and a rotation regulating part 140 for stopping rotation of a screw terminal fitting 130 screwed to the fuse element 110.

The fuse element 110 is integrally formed by press molding of the metal plate, and includes a battery connection plate part 111 connected to a battery terminal (not illustrated), an external connection plate part 112 for fastening the screw terminal fitting 130 connected to an external circuit, and a fusible part 113 which makes conductive connection between the battery connection plate part 111 and the external connection plate part 112 and also is fused when a rated or more current flows.

The fuse housing 120 covers a peripheral edge part of each of the connection plate parts 111, 112 so that the fuse element 110 does not make contact with the outside carelessly, and also defines a fusible part receiving part 121 for receiving the fusible part 113. The fusible part receiving part 121 is formed in a frame shape with upper and lower parts opened in order to visually check the received fusible part 113. And, the upper and lower opened parts of this fusible part receiving part 121 are covered with detachable covers 123 made of transparent resins.

The screw terminal fitting 130 is a terminal fitting crimped and connected to an end of an electric wire 150 for power feeding to the external circuit, and includes an electric wire crimp part 131 crimped and connected to the electric wire 150, and a screw part 132 with a flat plate shape continuous with this electric wire crimp part 131.

The screw part 132 is formed with an attachment hole into which a stud bolt 116 erected in the external connection plate part 112 is inserted, and is fixed to the external connection plate part 112 by a nut 117 screwed into the stud bolt 116.

The rotation regulating part 140 is a resin-made wall formed integrally to the fuse housing 120 like the case of PTL 1. This wall as the rotation regulating part 140 stops rotation of the screw terminal fitting 130 by abutting on one side edge 132a of the screw part 132 of the screw terminal fitting 130 as illustrated in FIGS. 4 and 5.

PTL 1 is JP-A-2007-87823.

SUMMARY OF THE INVENTION

However, when the rotation regulating part 140 for stopping rotation of the screw terminal fitting 130 is the resin-made wall as described above, as illustrated in FIG. 5, a thickness dimension D must be set at a large value in order to ensure strength. But, an increase in the thickness dimension D of the rotation regulating part 140 causes upsizing of the fuse unit 100 due to upsizing of the fuse housing 120.

Also, when the fuse housing 120 is formed with a local thick-wall part by the increase in the thickness dimension D of the rotation regulating part 140, a molding strain tends to occur in the fuse housing 120.

And, the occurrence of the molding strain or the upsizing of the fuse housing 120 may decrease assemblability to the battery.

Hence, an object of the invention is to solve the problem described above, and is to provide a fuse unit for connecting a battery, capable of miniaturizing the unit by downsizing of a rotation regulating part and also preventing occurrence of a molding strain in a resin-made fuse housing and improving assemblability to the battery.

The above object of the invention is achieved by the following configurations.

(1) A fuse unit for connecting a battery, including:

a fuse element being integrally formed of a metal plate, and having a battery connection plate part to be connected to the battery, an external connection plate part for fastening a screw terminal fitting connected to an external circuit, and a fusible part which makes conductive connection between the battery connection plate part and the external connection plate part and is fused when a rated or more current flows, a resin-made fuse housing that supports the fuse element, and a rotation regulating part for stopping rotation of the screw terminal fitting fastened to the external connection plate part, wherein the rotation regulating part has a terminal abutting part which is bent and formed by folding one edge of the external connection plate part and stops the rotation of the screw terminal fitting by abutting on one side edge of the screw terminal fitting, and a cover part which is formed integrally to the fuse housing and covers a back surface of the terminal abutting part.

According to the configuration of the above (1), the rotation regulating part that stops rotation of the screw terminal fitting fastened to the external connection plate part includes the terminal abutting part formed by folding one edge of the external connection plate part which is the metal plate, and this terminal abutting part made of the metal plate stops the rotation of the screw terminal fitting by abutting on one side edge of the screw terminal fitting. And, the terminal abutting part made of the metal plate can ensure higher strength even for a thin wall as compared with the case of stopping the rotation of the screw terminal fitting by a resin-made wall. As a result, thinning of the rotation regulating part can miniaturize the rotation regulating part.

Also, since the rotation regulating part includes the resin-made cover part for covering the back surface of the terminal abutting part made of the metal plate, a short circuit caused by contact between the back surface of the terminal abutting part made of the metal plate and metal equipment of the outside can be prevented. And, the resin-made cover part could ensure insulation properties on the back surface of the terminal abutting part and does not make contact with the screw terminal fitting, with the result that the resin-made cover part does not require high mechanical strength. As a result, the resin-made cover part can be thinned to suppress increasing in size and weight of the unit. Also, thinning of the resin-made cover part can avoid forming a local thick-wall part in the fuse housing, and occurrence of a molding strain resulting from the local thick-wall part can be prevented. Consequently, the occurrence of the molding strain in the resin-made fuse housing can be prevented to improve assemblability to the battery.

Also, according to the configuration of the above (1), the external connection plate part to which the terminal abutting part as the rotation regulating part is formed integrally is upsized by the size of the terminal abutting part and a surface area is increased, with the result that a heat capacity is increased and simultaneously, heat dissipation properties are improved, and an increase in temperature by energization in a fastening part of the screw terminal fitting can also be reduced.

(2) The fuse unit according to configuration of the above (1), wherein a height of the terminal abutting part is at least higher than a thickness of a screw part of the screw terminal fitting.

According to the configuration of the above (2), the screw terminal fitting can be securely received by the terminal abutting part.

(3) The fuse unit according to configuration of the above (1), wherein an end surface of the terminal abutting part is covered by the cover part.

According to the configuration of the above (3), corrosion of the external connection plate part can be prevented by covering the end of the terminal abutting part.

(4) The fuse unit according to configuration of the above (3), wherein the terminal abutting part and the cover part are flush in an abutting surface of the rotation regulating part abutting on the screw terminal fitting.

According to the configuration of the above (4), the screw terminal fitting can be inserted without bumping the end surface of the terminal abutting part, and the screw terminal fitting can be easily assembled.

The fuse unit for connecting the battery according to the invention can miniaturize the unit by downsizing of the rotation regulating part and also prevent the occurrence of the molding strain in the resin-made fuse housing and improve the assemblability to the battery.

The invention has briefly been described above. Further, the details of the invention will become more apparent by reading through a mode (hereinafter called an "embodiment") for carrying out the invention described below with reference to the accompanying drawings.

DETAILED DESCRIPTION OF THE EXEMPLARY EMBODIMENTS

A preferred embodiment of a fuse unit for connecting a battery according to the invention will hereinafter be described in detail with reference to the drawings.

Figure 1:
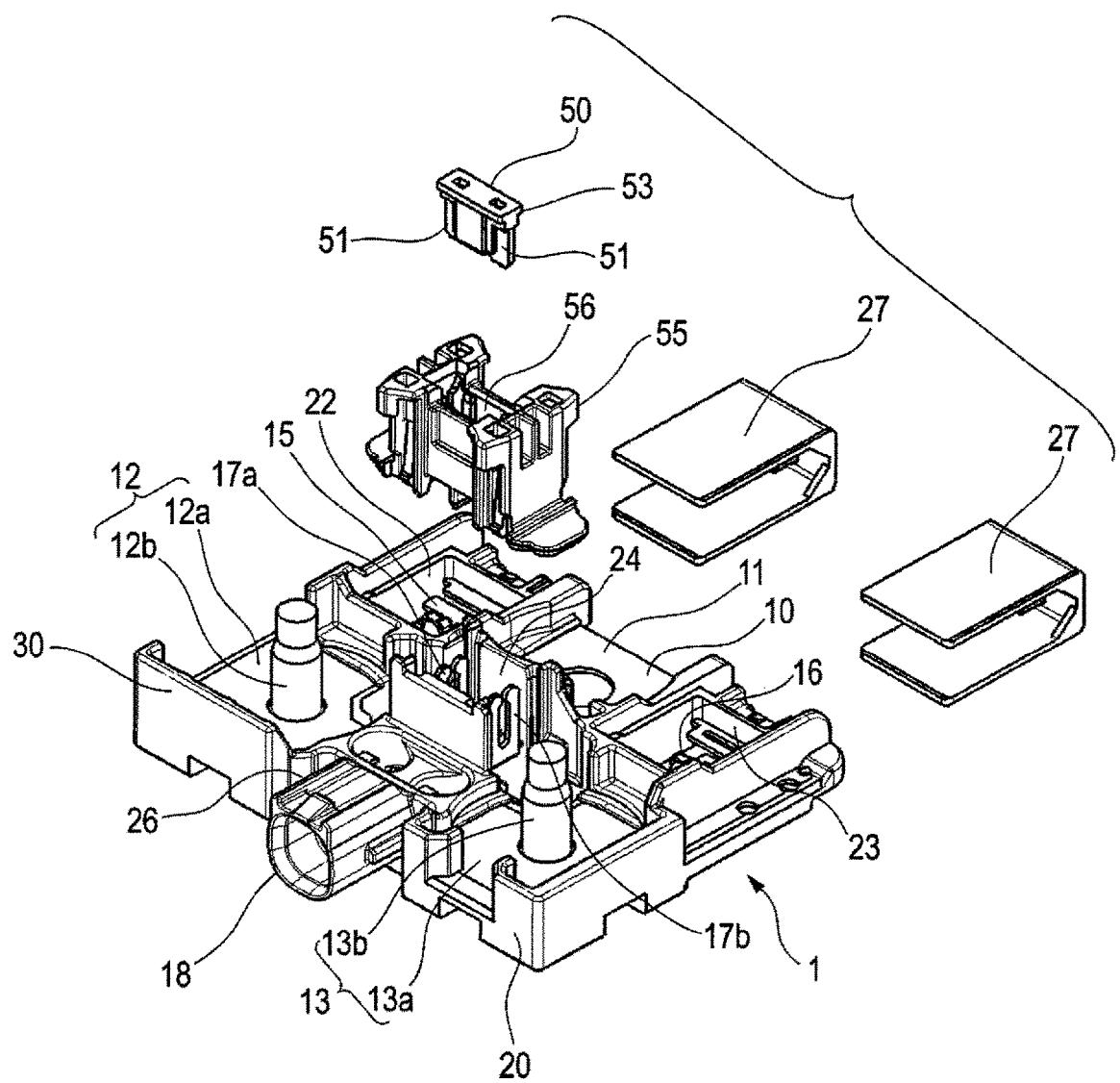
FIG. 1 is an exploded perspective view of a fuse unit for connecting a battery according to an embodiment of the invention.
Figure 2:
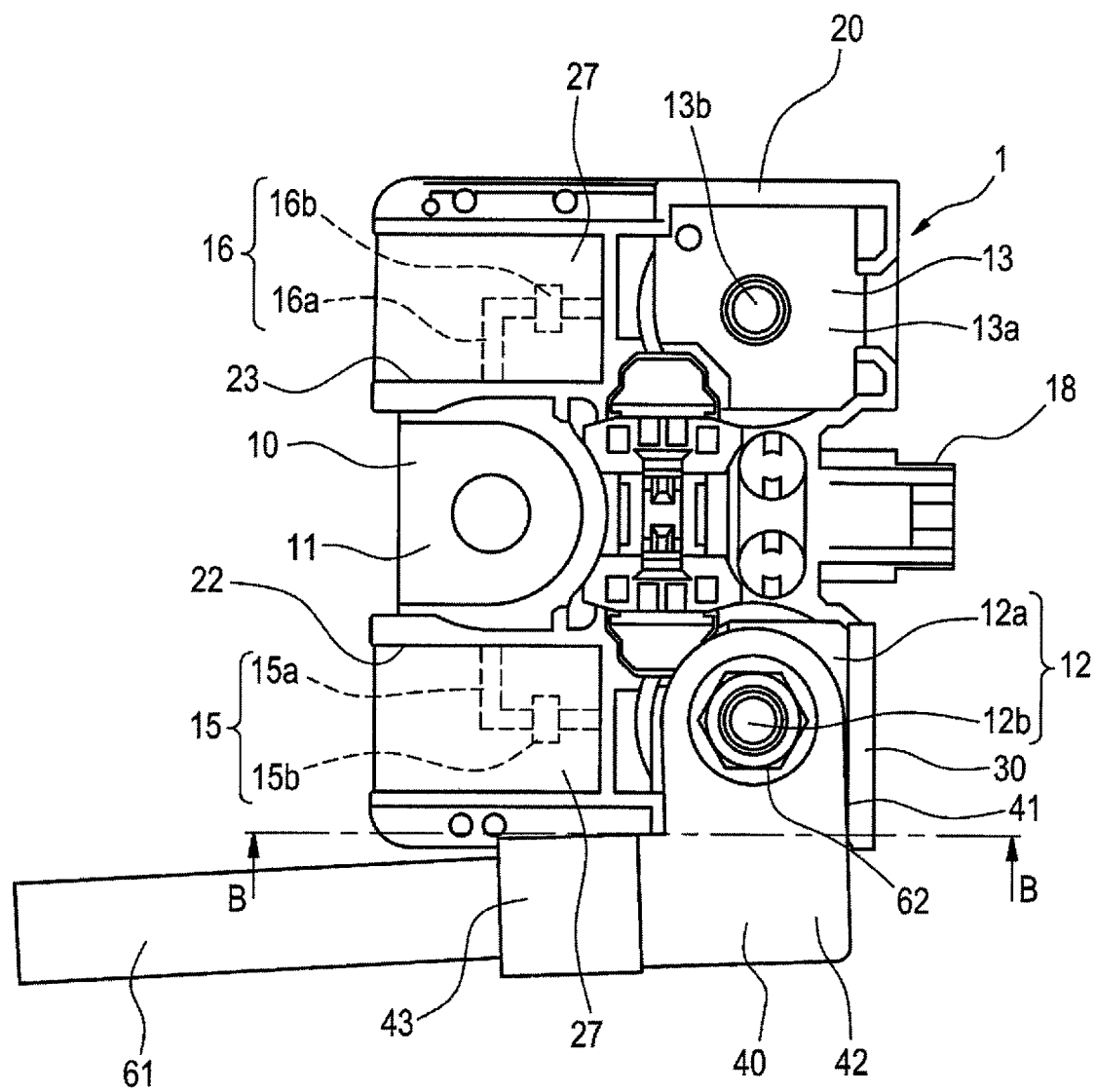
FIG. 2 is a plan view of the fuse unit for connecting the battery of the embodiment.
Figure 3:
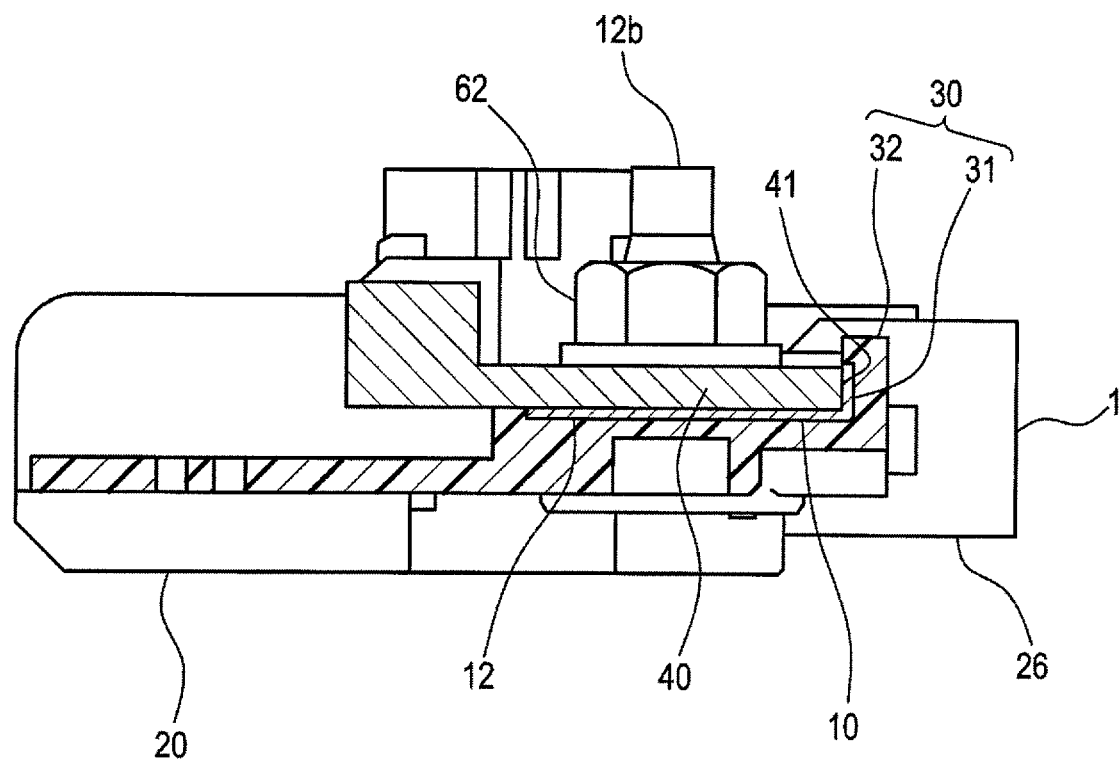
FIG. 3 is a sectional view taken on line B-B of FIG. 2.
Figure 4:
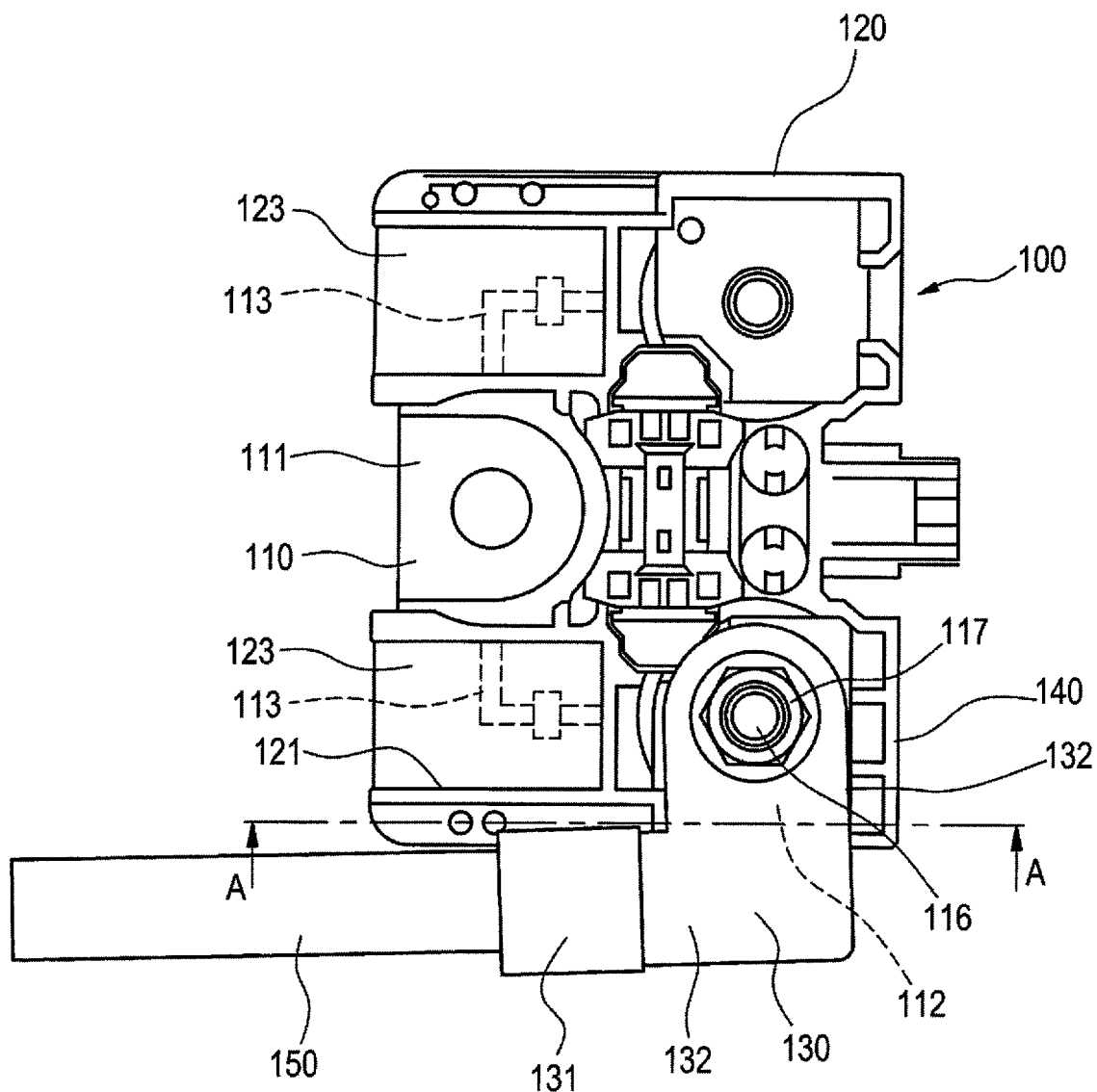
FIG. 4 is a plan view of a conventional fuse unit for connecting a battery.
Figure 5:
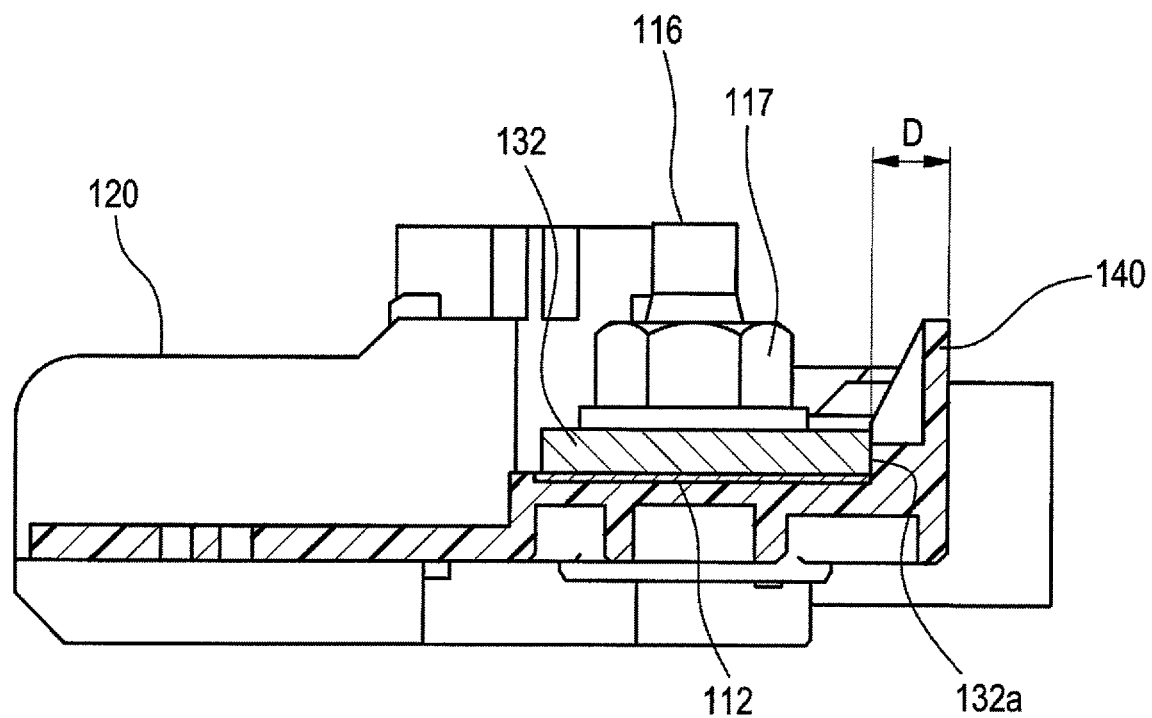
FIG. 5 is a sectional view taken on line A-A of FIG. 4.

FIGS. 1 to 3 illustrate the fuse unit for connecting the battery according to an embodiment of the invention, and FIG. 1 is an exploded perspective view of the fuse unit for connecting the battery according to the embodiment of the invention, and FIG. 2 is a plan view of the fuse unit for connecting the battery of the embodiment, and FIG. 3 is a sectional view taken on line B-B of FIG. 2.

This fuse unit 1 for connecting the battery of the embodiment is mounted on a battery box by making connection to a battery terminal (not illustrated) fitted and connected to a battery post of the battery box mounted in a vehicle.

This fuse unit 1 includes a fuse element 10 integrally formed of a metal plate, a resin-made fuse housing 20 for supporting the fuse element 10, and a rotation regulating part 30 for stopping rotation of a screw terminal fitting 40 screwed to an external connection plate part 12 of the fuse element 10 described below.

The fuse element 10 is integrally formed by press molding of the metal plate, and includes a battery connection plate part 11 connected to the battery terminal (not illustrated), external connection plate parts 12, 13 for fastening the screw terminal fitting 40 connected to an external circuit, a first fusible part 15 which makes conductive connection between the battery connection plate part 11 and the external connection plate part 12 and also is fused when a rated or more current flows, a second fusible part 16 which makes conductive connection between the battery connection plate part 11 and the external connection plate part 13 and also is fused when a rated or more current flows, a pair of input-output terminal fittings 17a, 17b to which a blade-shaped fuse 50 (see FIG. 1) is connected, and an electric wire connection part 18 to which an external electric wire is connected as illustrated in FIG. 2.

The external connection plate parts 12, 13 are configured to plant stud bolts 12b, 13b in flat plate-shaped connection plate bodies 12a, 13a as illustrated in FIG. 1.

In the first fusible part 15 and the second fusible part 16, fusing ratings are set by embedding chips 15b, 16b made of alloy such as tin or lead having a melting point lower than that of the metal plate used in the fuse element 10 in strip-shaped parts 15a, 16a with small cross-sectional areas formed integrally to the battery connection plate part 11 and the external connection plate parts 12, 13 by punching of the metal plate.

The pair of input-output terminal fittings 17a, 17b is tuning fork-shaped terminal fittings for pinching blades 51 of the blade-shaped fuse 50. One of the pair of input-output terminal fittings 17a, 17b is formed integrally to the battery connection plate part 11, and the other terminal fitting 17a, 17b is conductively connected to the electric wire connected to the electric wire connection part 18. When the blade-shaped fuse 50 is connected to this pair of input-output terminal fittings 17a, 17b, the battery connection plate part 11 and the electric wire (not illustrated) connected to the electric wire connection part 18 become conductively connected through the blade-shaped fuse 50.

The blade-shaped fuse 50 connected to the pair of input-output terminal fittings 17a, 17b is configured to include a pair of blades 51, 51 formed of a metal plate, a fusible body for making conductive connection between proximal ends of this pair of blades 51, 51, and a resin-made housing 53 for receiving this fusible body and the proximal end of each of the blades 51 as illustrated in FIG. 1.

The blade-shaped fuse 50 is attached to a resin-made fuse box 55 united to the fuse unit 1 as illustrated in FIG. 1. The pair of integrally formed input-output terminal fittings 17a, 17b of the fuse element 10 is inserted into the fuse box 55 united to the fuse unit 1. Then, when the blade-shaped fuse 50 is attached to a fuse attachment hole 56 of the fuse box 55 united to the fuse unit 1, a state in which the blade-shaped fuse 50 is conductively connected to the pair of input-output terminal fittings 17a, 17b is formed.

The resin-made fuse housing 20 is integrated with the fuse element 10 by, for example, insert molding. The fuse housing 20 of the present embodiment covers a peripheral edge part of each of the connection plate parts 11 to 13 so that the fuse element 10 does not make contact with the outside carelessly, and also includes fusible part receiving parts 22, 23 for receiving the fusible parts 15, 16, a box attaching part 24 for attaching the fuse box 55, and the electric wire connection part 18 as illustrated in FIGS. 1 and 2.

The fusible part receiving parts 22, 23 are formed in frame shapes with upper and lower parts opened so that the received fusible parts 15, 16 can be visually checked. And, the upper and lower opened parts of the fusible part receiving parts 22, 23 are covered with detachable covers 27 made of transparent resins. The covers 27 enable the fusible parts 15, 16 to be visually checked, and can simultaneously prevent the fused metal from scattering.

The pair of input-output terminal fittings 17a, 17b is positioned in the center of the box attaching part 24 of the fuse housing 20. When the fuse box 55 is attached to the box attaching part 24, the pair of input-output terminal fittings 17a, 17b is inserted into the fuse box 55.

The rotation regulating part 30 of the embodiment includes a terminal abutting part 31 made of a metal plate, and a cover part 32 for covering a back surface of the terminal abutting part 31 as illustrated in FIG. 3.

The terminal abutting part 31 is formed by folding one edge of the external connection plate part 12 at a right angle. This terminal abutting part 31 stops rotation of the screw terminal fitting 40 by abutting on one side edge 41 of the screw terminal fitting 40.

The cover part 32 is formed integrally to the fuse housing 20 so as to cover the back surface of the terminal abutting part 31.

The screw terminal fitting 40 connected to the external connection plate part 12 is a terminal fitting crimped and connected to the end of an electric wire 61 for power feeding to an external circuit, and includes an electric wire crimp part 43 crimped and connected to the electric wire 61, and a screw part 42 with a flat plate shape continuous with this electric wire crimp part 43 as illustrated in FIG. 2.

The screw part 42 is formed with an attachment hole into which the stud bolt 12b erected in the external connection plate part 12 is inserted, and is fixed to the external connection plate part 12 by a nut 62 screwed into the stud bolt 12b.

In the fuse unit 1 of the embodiment described above, the rotation regulating part 30 for stopping rotation of the screw terminal fitting 40 fastened to the external connection plate part 12 includes the terminal abutting part 31 formed by folding one edge of the external connection plate part 12 which is the metal plate, and this terminal abutting part 31 made of the metal plate stops the rotation of the screw terminal fitting 40 by abutting on one side edge 41 of the screw terminal fitting 40. And, the terminal abutting part 31 made of the metal plate can ensure higher strength even for a thin wall as compared with the case of stopping the rotation of the screw terminal fitting 40 by a resin-made wall. As a result, thinning of the rotation regulating part 30 can miniaturize the rotation regulating part.

Also, since the rotation regulating part 30 includes the resin-made cover part 32 for covering the back surface of the terminal abutting part 31 made of the metal plate, a short circuit caused by contact between the back surface of the terminal abutting part 31 made of the metal plate and metal equipment of the outside can be prevented. And, the resin-made cover part 32 could ensure insulation properties on the back surface of the terminal abutting part 31 and does not make contact with the screw terminal fitting 40, with the result that the resin-made cover part 32 does not require high mechanical strength. As a result, the resin-made cover part 32 can be thinned to suppress increasing in size and weight of the unit. Also, thinning of the resin-made cover part 32 can avoid forming a local thick-wall part in the fuse housing 20, and occurrence of a molding strain resulting from the local thick-wall part can be prevented. Consequently, the occurrence of the molding strain in the resin-made fuse housing 20 can be prevented to improve assemblability to the battery.

Also, in the case of the fuse unit 1 of the embodiment, the external connection plate part 12 to which the terminal abutting part 31 as the rotation regulating part 30 is formed integrally is upsized by the size of the terminal abutting part 31 and a surface area is increased, with the result that a heat capacity is increased and simultaneously, heat dissipation properties are improved, and an increase in temperature by energization in a fastening part of the screw terminal fitting 40 can also be reduced.

In addition, the invention is not limited to the embodiment described above, and changes, improvements, etc. can be made properly. Moreover, as long as the invention can be achieved, materials, shapes, dimensions, the number of components, arrangement places, etc. of each component in the embodiment described above are freely selected and are not limited.

Here, the features of the embodiment of the fuse unit according to the invention described above will hereinafter be summarized and listed briefly.

[1] A fuse unit (1) for connecting a battery, including:

a fuse element (10) being integrally formed of a metal plate, and having a battery connection plate part (11) to be connected to the battery, an external connection plate part (12) for fastening a screw terminal fitting (40) connected to an external circuit, and fusible parts (15, 16) which make conductive connection between the battery connection plate part (11) and the external connection plate part (12) and are fused when a rated or more current flows, a resin-made fuse housing (20) that supports the fuse element (10), and a rotation regulating part (30) that stops rotation of the screw terminal fitting (40) fastened to the external connection plate part (12), wherein the rotation regulating part (30) has a terminal abutting part (31) which is bent and formed by folding one edge of the external connection plate part (12) and stops the rotation of the screw terminal fitting (40) by abutting on one side edge (41) of the screw terminal fitting (40), and a cover part (32) which is formed integrally to the fuse housing (20) and covers a back surface of the terminal abutting part (31).

[2] The fuse unit according to the above [1],
wherein a height of the terminal abutting part (31) is at least higher than a thickness of a screw part (42) of the screw terminal fitting (40).

[3] The fuse unit according to the above [1],
wherein an end surface of the terminal abutting part (31) is covered by the cover part (32).

[4] The fuse unit according to the above [3],
wherein the terminal abutting part (31) and the cover part (32) are flush in an abutting surface of the rotation regulating part (30) abutting on the screw terminal fitting (40).

The invention has been described in detail with reference to the specific embodiment, but it is apparent to those skilled in the art that various changes or modifications can be made without departing from the spirit and scope of the invention.

The invention has an effect capable of miniaturizing a unit by downsizing of a rotation regulating part and also preventing occurrence of a molding strain in a resin-made fuse housing and improving assemblability to a battery. The invention having this effect is useful for a fuse unit for connecting the battery.

What is claimed is:

1. A fuse unit for connecting a battery, comprising:
a fuse element being integrally formed of a metal plate, and having a battery connection plate part to be connected to the battery, an external connection plate part for fastening a screw terminal fitting connected to an external circuit, and a fusible part which makes conductive connection between the battery connection plate part and the external connection plate part and is fused when a rated or more current flows,
a resin-made fuse housing that supports the fuse element, and
a rotation regulating part that stops rotation of the screw terminal fitting fastened to the external connection plate part,
wherein the rotation regulating part includes a terminal abutting part and a cover part, the terminal abutting part is one edge of the external connection plate part that is bent and folded relative to a remainder of the external connection plate part, the terminal abutting part includes an abutting surface, a back surface and an end surface, the abutting surface faces and abuts one side edge of the screw terminal fitting when the screw terminal fitting is secured to the external connection plate part such that the terminal abutting part stops the rotation of the screw terminal fitting, the back surface is on a side of the terminal abutting part that is opposite to the abutting surface, the end surface extends from the abutting surface to the back surface, and the cover part is a resin-made integral portion of the fuse housing and covers the back surface of the terminal abutting part, and the cover part extends beyond the end surface of the terminal abutting part such that a height of the cover part is at least higher than a height of the terminal abutting part.

2. The fuse unit according to claim 1,
wherein the height of the terminal abutting part is at least higher than a thickness of a screw part of the screw terminal fitting.

3. The fuse unit according to claim 1,
wherein the end surface of the terminal abutting part is covered by the cover part.

4. The fuse unit according to claim 3,
wherein the terminal abutting part and the cover part are flush in the abutting surface of the rotation regulating part abutting on the screw terminal fitting.

5. A fuse unit for connecting a battery, comprising:
a fuse element being integrally formed of a metal plate, and having a battery connection plate part to be connected to the battery, an external connection plate part for fastening a screw terminal fitting connected to an external circuit, and a fusible part which makes conductive connection between the battery connection plate part and the external connection plate part and is fused when a rated or more current flows,
a resin-made fuse housing that supports the fuse element, and
a rotation regulating part that stops rotation of the screw terminal fitting fastened to the external connection plate part, wherein
the rotation regulating part includes a terminal abutting part and a cover part,
the terminal abutting part is one edge of the external connection plate part that is bent and folded relative to a remainder of the external connection plate part, the terminal abutting part includes an abutting surface, a back surface and an end surface, the abutting surface faces and abuts one side edge of the screw terminal fitting when the screw terminal fitting is secured to the external connection plate part such that the terminal abutting part stops rotation of the screw terminal fitting, the back surface is on a side of the terminal abutting part that is opposite to the abutting surface, and the end surface extends from the abutting surface to the back surface, and
the cover part is a resin-made integral portion of the fuse housing and covers the back surface and the end surface of the terminal abutting part.

6. The fuse unit according to claim 5,
wherein the cover part includes a facing surface that is flush with the abutting surface of the terminal abutting part.

* * * * *